United States Patent [19]
Abramov et al.

[11] Patent Number: 6,029,475
[45] Date of Patent: Feb. 29, 2000

[54] BATCHING OF MOLTEN GLASS IN THE PRODUCTION OF GRADED INDEX OF REFRACTION GLASS BODIES

[75] Inventors: Oleg Y. Abramov; Stanislav A. Koltchanov; Leila V. Laisheva, all of St. Petersburg, Russian Federation

[73] Assignee: LightPath Technologies, Inc., Albuquerque, N.Mex.

[21] Appl. No.: 09/109,702

[22] Filed: Jun. 30, 1998

[51] Int. Cl.[7] .............................. C03B 5/26; C03B 5/28; C03B 7/00; C03B 7/14; C03B 13/10
[52] U.S. Cl. ..................... 65/121; 65/122; 65/134.1; 65/134.9; 65/145; 65/146; 65/347
[58] Field of Search ................................. 65/66, 121, 122, 65/83, 134.9, 134.1, 17.3, 144, 145, 146, 334, 347, 375

[56] References Cited

U.S. PATENT DOCUMENTS

| | | |
|---|---|---|
| 3,614,197 | 10/1971 | Nishizawa et al. . |
| 3,726,656 | 4/1973 | Reid et al. . |
| 4,032,313 | 6/1977 | Tokuhara . |
| 4,099,835 | 7/1978 | French et al. . |
| 4,351,659 | 9/1982 | Beales et al. . |
| 4,457,771 | 7/1984 | Ambrogi . |
| 4,466,818 | 8/1984 | Brongersma . |
| 4,784,679 | 11/1988 | Lentz . |
| 4,875,917 | 10/1989 | Lentz . |
| 4,883,522 | 11/1989 | Hagerty et al. . |
| 4,929,065 | 5/1990 | Hagerty et al. . |
| 5,049,175 | 9/1991 | Ross et al. . |
| 5,200,858 | 4/1993 | Hagerty et al. . |
| 5,630,857 | 5/1997 | Xu et al. . |

*Primary Examiner*—Stanley S. Silverman
*Assistant Examiner*—Jacqueline A. Ruller
*Attorney, Agent, or Firm*—Benman & Collins

[57] ABSTRACT

Gradient refractive index elements are fabricated from the melt, using two or more molten glass compositions, to prevent bubble formation in the elements. The individual glass compositions are melted in separate containers, and then added as appropriate to a single crucible. The more dense glasses settle to the bottom of the crucible, while the less dense glasses float on top of the melt layer. As a consequence of using molten glass, no bubbles appear. Batching of the process can be done by the level of the free melt surface, which means that one can control the batched volume of the melted glass by controlling the level of the free melt surface in the crucible.

8 Claims, 2 Drawing Sheets

BATCHING OF MOLTEN GLASS IN THE PRODUCTION OF GRADED INDEX OF REFRACTION GLASS BODIES

TECHNICAL FIELD

The present invention relates to the fabrication of glass having a graded index of refraction (GRIN), and, more particularly, to a process for the manufacture of GRIN glass starting from molten components.

BACKGROUND ART

Graded index of refraction glass provides unique optical properties that are otherwise unavailable with conventional homogeneous glasses. For example, chromatic aberrations may be corrected within a single lens by a judicious selection of the profile of the index gradient, thereby reducing the number of components in an optical system by as much as a factor of two. Such GRIN glass is available from LightPath Technologies, Inc. (Albuquerque, N.Mex.) under the trademark GRADIUM®.

The fabrication of such graded index of refraction glass has been disclosed in a number of references, including starting from powders, each having a different composition (U.S. Pat. No. 4,883,522, issued to James J. Hagerty et al), starting from stacked glass plates, each having a different composition (U.S. Pat. No. 4,929,065, issued to James J. Hagerty et al), and starting from glass frits, each having a different composition (U.S. Pat. No. 5,630,857, issued to Xiaojie Xu et al), all assigned to the same assignee as the present invention.

While each of these methods is certainly suitable for making GRIN glass lens blanks, the melting of powders or frit can lead to the formation of bubbles in the melt. The removal of bubbles requires processing time, thereby increasing production costs.

The problem of air bubble removal exists only in the case of preparation of GRIN glass from frit or powder. When large glass plates rather than frit are sintered, no bubbles will form, or will appear only in small amounts. However, this approach requires cutting and grinding these plates, and ensuring that each plate has the proper shape and weight. Fabrication of the plates entails undesirable expenditures of time.

Thus, a need exists for accelerating the process of bubble removal.

SUMMARY OF THE INVENTION

In accordance with the present invention, bubbles are removed beforehand by melting the glasses and providing two or more molten glass compositions in the fabrication of gradient refractive index elements. The individual glass compositions are melted in separate containers, and then added as appropriate to a single crucible, or mold. The more dense glasses settle to the bottom of the crucible, while the less dense glasses float on top of the melt layer. As a consequence of using molten glass, no bubbles appear. Batching of the process can be done by the level of the free melt surface. That is, one can control batched volume of the melted glass by control of the level of the free melt surface in the mold.

DETAILED DESCRIPTION OF THE INVENTION

Figure 1:
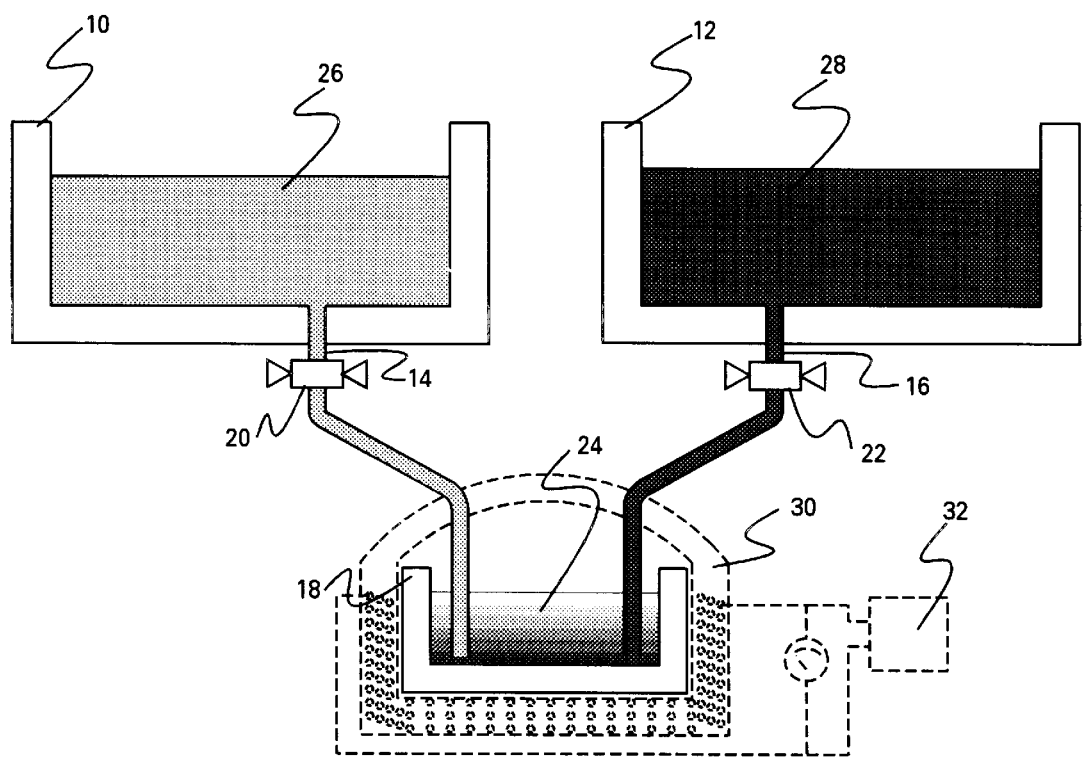
FIG. 1 depicts batching of molten glass, employing two separate containers, each containing a different molten glass composition.

In accordance with the present invention, melting the components for GRIN glass elements beforehand is done in separate containers 10, 12, as shown in FIG. 1. Batching the components is done in liquid form. While two containers 10, 12 are shown in the FIG. 1, it will be readily appreciated that a plurality of such containers may be employed, each containing a glass of a particular composition in a molten state.

Batching the glass melts into the mold can be effected in different ways. FIG. 1 illustrates the method of liquid supply, employing tubes 14, 16 from containers 10, 12, respectively, into mold 18. Each tube 14, 16 passes through a batcher 20, 22, respectively. As shown in FIG. 1, the tube ends are placed into melt 24, in the mold 18. Thus, the lighter glass entering the mold floats up through the melt layer, and no bubbles appear. The heavier glass sinks down. Batching can be done by the level of the free melt surface.

Containers 10, 12 should have a larger volume than the mold 18. The glasses 26, 28 in each container 10, 12, respectively, are always in a molten state. As the melt is expended, new pieces of solid glass of the composition in each container 10, 12 arc added periodically into these containers. The mold 18 is filled through the batchers 20, 22, and its filling depends only weakly on that of the container (if it is not empty). The constantly hot furnace 30 in which the mold 18 is kept requires continuous use, and therefore this process is suitable for mass production.

The furnace 30 surrounds the mold 18. Control means 32 is used to maintain the furnace at an elevated temperature for a period of time.

Optionally, instead of using all liquid components, one may melt only one or a few of them. The remaining glass(es) may be introduced into the melt in the form of frit. In this case, the problem of bubble removal is also solved. However, the operations of frit preparation and batching are not excluded from the process of the present invention.

Figure 2:
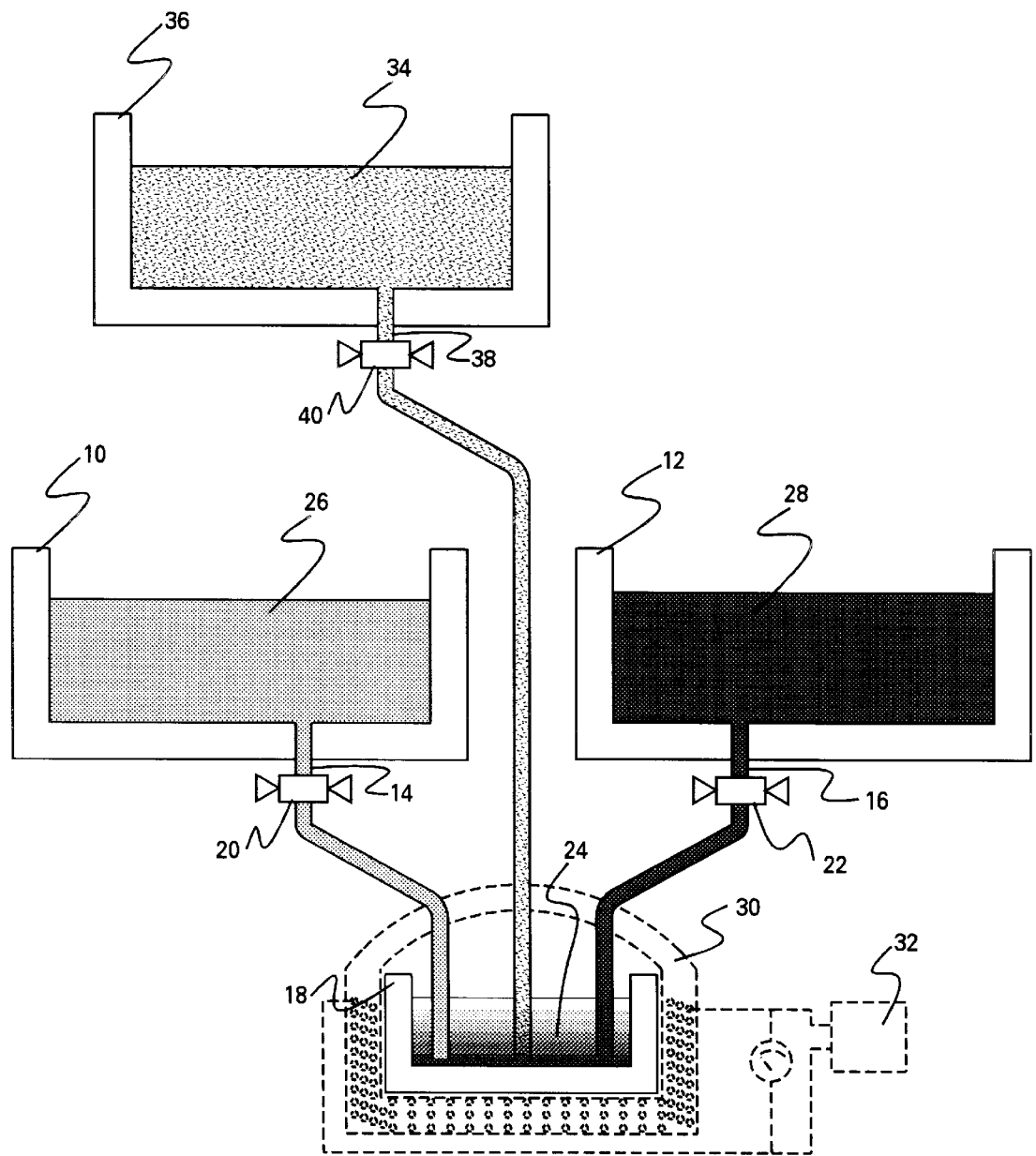
FIG. 2 depicts batching of molten glass, employing three separate containers, two containing a different molten glass composition, as in FIG. 1, and one containing glass frit.

FIG. 2 depicts the use of frit in conjunction with molten glass. In particular, glass frit 34 in container 36 is introduced into the mold 18 via tube 38 and batcher 40. The glass frit 34 has a composition that is different from either of the molten glasses 26, 28.

The use of the present invention provides the following advantages:

1. excluding the flit preparation and batching operations, at least for one or more glasses;
2. elimination of the bubble problem associated with other approaches; and
3. reduction of energy expenditures through elimination of the time-consuming furnace heating and glass melting operations.

Thus, there has been disclosed a method for batching of molten glass in the fabrication of gradient index of refraction materials. It will be appreciated that various changes and modifications may be made of an obvious nature, and all such changes and modifications are considered to fall within the scope of the present invention, as defined by the appended claims.

What is claimed is:

1. A process for fabricating glass bodies having a graded index of refraction from one surface to an opposite surface, comprising:

(a) providing at least two containers, each containing a glass having a specific composition and a specific index of refraction, at least one of said containers containing said glass in a molten state;

(b) dispensing measured amounts of glass from each said container into a mold in a furnace maintained at an elevated temperature, said measured amounts of glass forming a molten body of glass;

(c) maintaining said molten body of glass in said mold at said elevated temperature for a period of time sufficient to provide said body of glass with a smoothly varying index of refraction from a bottom surface of said body to a top surface of said body; and (d) cooling said body of glass to room temperature.

2. The process of claim 1 in which each container contains a molten glass having said specific composition and said specific index of refraction.

3. The process of claim 1 in which at least one container, but not all containers, contains glass having said specific composition and said specific index of refraction in frit form.

4. The process of claim 1 in which said elevated temperature is sufficient to maintain each glass in a molten state.

5. Apparatus for fabricating glass bodies having a graded index of refraction from one surface to an opposite surface, comprising:

(a) a mold in a furnace, said mold constructed and arranged to hold a quantity of at least two glass compositions;

(b) means for maintaining said furnace at an elevated temperature for a period of time;

(c) at least two containers, each containing a glass having a specific composition and a specific index of refraction, at least one of said containers containing said glass in a molten state; and (d) means for dispensing measured amounts of glass from each said container into said mold.

6. The apparatus of claim 5 in which all said containers contain said glass in a molten state.

7. The apparatus of claim 5 in which each container contains a molten glass having said specific composition and said specific index of refraction.

8. The apparatus of claim 5 in which at least one container, but not all containers, contains glass having said specific composition and said specific index of refraction in frit form.

* * * * *